United States Patent
Pan et al.

(10) Patent No.: US 11,625,112 B1
(45) Date of Patent: Apr. 11, 2023

(54) INPUT DEVICE

(71) Applicant: Primax Electronics Ltd., Taipei (TW)

(72) Inventors: Yung-Tai Pan, Taipei (TW); Chun-Che Wu, Taipei (TW); Ting-Sheng Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/826,344

(22) Filed: May 27, 2022

Related U.S. Application Data

(60) Provisional application No. 63/296,085, filed on Jan. 3, 2022.

(51) Int. Cl.
 *G06F 3/0362* (2013.01)
(52) U.S. Cl.
 CPC ................... *G06F 3/0362* (2013.01)
(58) Field of Classification Search
 CPC ........................................... G06F 3/033–0362
 See application file for complete search history.

(56) References Cited

U.S. PATENT DOCUMENTS

| | | | | |
|---|---|---|---|---|
| 6,525,714 B1* | 2/2003 | Varga | ..................... | G06F 3/0362 345/157 |
| 8,902,165 B1* | 12/2014 | Pflughaupt | ............ | G06F 3/0362 345/157 |
| 2009/0247347 A1* | 10/2009 | Choi | ................... | F16H 57/0482 475/159 |
| 2021/0351662 A1* | 11/2021 | Sohn | ....................... | F03G 5/086 |

* cited by examiner

*Primary Examiner* — Hang Lin
(74) *Attorney, Agent, or Firm* — Kirton McConkie; Evan R. Witt

(57) ABSTRACT

An input device includes a casing, a base member, a ball member, a control ring and a gravity wheel. The casing includes an upper cover and a lower cover. The upper cover has an opening. The ball member is installed on the base member. The ball member is partially exposed outside the opening. The control ring is arranged around the base member. The control ring is partially exposed outside the opening. The control ring is freely rotatable around the base member. The control ring includes a first inclined part, a rack structure, and a lateral wall. The lateral wall is connected with the first inclined part and the rack structure. The gravity wheel is engaged with the rack structure. Consequently, the rotation of the control ring is suppressed by the gravity wheel.

20 Claims, 11 Drawing Sheets

INPUT DEVICE

CROSS-REFERENCE TO RELATED APPLICATION

This application claims priority to U.S. Provisional Patent Application No. 63/296,085 filed Jan. 3, 2022, the contents of which are incorporated herein by reference.

FIELD OF THE INVENTION

The present invention relates to an input device, and more particularly to an input device with a control ring.

BACKGROUND OF THE INVENTION

An input device such as a trackball is usually equipped with a rotatable control ring (or referred as a scroll ring or a scroll wheel). By operating the control ring, the function of moving up/down a web page, the function of zooming a map or other associated functions can be implemented.

However, the operation of the control ring still has some drawbacks. For example, the operation of the control ring may result in a light and empty feeling. In case that the control ring is accidentally touched by the user, the control ring is easily rotated and thus a control signal is generated.

Therefore, the design of the control ring needs to be further improved.

SUMMARY OF THE INVENTION

In order to overcome the drawbacks of the conventional technologies, the present invention provides a control ring with a damping effect. The control ring is applied to an input device. The input device is additionally equipped with a rack structure, a gravity wheel and a bearing. Consequently, it is not easy to erroneously touch or erroneously rotate the control ring. When the control ring is operated by the user, the control ring can be freely and smoothly rotated.

In accordance with an aspect of the present invention, an input device is provided. The input device includes a casing, a base member, a ball member, a control ring and a gravity wheel. The casing includes an upper cover and a lower cover. The upper cover has an opening. The ball member is installed on the base member. The ball member is partially exposed outside the opening. The control ring is arranged around the base member. The control ring is partially exposed outside the opening. The control ring is freely rotatable around the base member. The control ring includes a first inclined part, a rack structure, and a lateral wall. The lateral wall is connected with the first inclined part and the rack structure. The gravity wheel is engaged with the rack structure. A rotation of the control ring is suppressed by the gravity wheel.

In an embodiment, the input device further includes a bearing, and the gravity wheel includes a gear and a rotation shaft. The gear is engaged with the rack structure. The rotation shaft is inserted into the bearing.

In an embodiment, the input device further includes an accommodation space. The accommodation space is formed in the lower cover. The bearing is accommodated within the accommodation space.

In an embodiment, the input device further includes an upper clamping seat and a lower clamping seat. The gravity wheel is clamped between the upper clamping seat and the lower clamping seat. The upper clamping seat and the lower clamping seat are installed on the lower cover.

In an embodiment, the input device further includes a screw, the upper clamping seat includes a first pivotal hole and a first perforation, the lower clamping seat includes a second pivotal hole and a second perforation, and the lower cover includes a stud. After the screw is penetrated through the first perforation and the second perforation sequentially, the screw is tightened into the stud.

In an embodiment, the input device further includes a bearing, an upper clamping seat and a lower clamping seat. The gravity wheel is clamped between the upper clamping seat and the lower clamping seat. The upper clamping seat includes a first pivotal hole. The lower clamping seat includes a second pivotal hole. The gravity wheel includes a gear and a rotation shaft. The rotation shaft includes a first shaft part and a second shaft part. The first shaft part and the second shaft part are respectively located at two lateral sides of the gear. The first shaft part is inserted into the first pivotal hole. The second shaft part is penetrated through the second pivotal hole and inserted into a bearing of the input device.

In an embodiment, the gravity wheel is made of polyformaldehyde (POM), polycarbonate (PC) or aluminum.

In an embodiment, the base member includes a supporting seat, and the supporting seat includes a concave structure and a second inclined part. The ball member is installed within the concave structure. The first inclined part of the control ring is installed on the second inclined part.

In an embodiment, the input device further includes plural first balls, and the first inclined part and the second inclined part are separated from each other through the plural first balls.

In an embodiment, the plural first balls are installed on the second inclined part and partially protruded outside the second inclined part.

In an embodiment, the input device further includes plural lubricating pads. A friction between the first inclined part and the second inclined part is reduced through the plural lubricating pads.

In an embodiment, the plural lubricating pads are installed on the second inclined part.

In an embodiment, the plural lubricating pads are made of Teflon.

In an embodiment, the base member further includes a stopping ring, and the stopping ring is installed on and assembled with the supporting seat. The stopping ring stops the ball member from being detached from the base member.

In an embodiment, the lateral wall is arranged around the second inclined part.

In an embodiment, the control ring further includes an anti-slip structure, the anti-slip structure is installed on the first inclined part.

In an embodiment, the input device further includes a weight ring, the gravity wheel includes a gear and a rotation shaft, and the rotation shaft includes a first shaft part and a second shaft part. The first shaft part and the second shaft part are respectively located at two lateral sides of the gear, the gear is engaged with the rack structure. The second shaft part is inserted into the weight ring.

In an embodiment, the weight ring is made of a metallic material with magnetic permeability.

In an embodiment, the input device further includes a magnet, and the magnet is located under the weight ring. The weight ring is magnetically attracted by the magnet. The magnet and the weight ring are not contacted with each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a control ring with a rotation damping effect and an input device using the control ring. Moreover, the control ring can be rotated smoothly.

Figure 1:
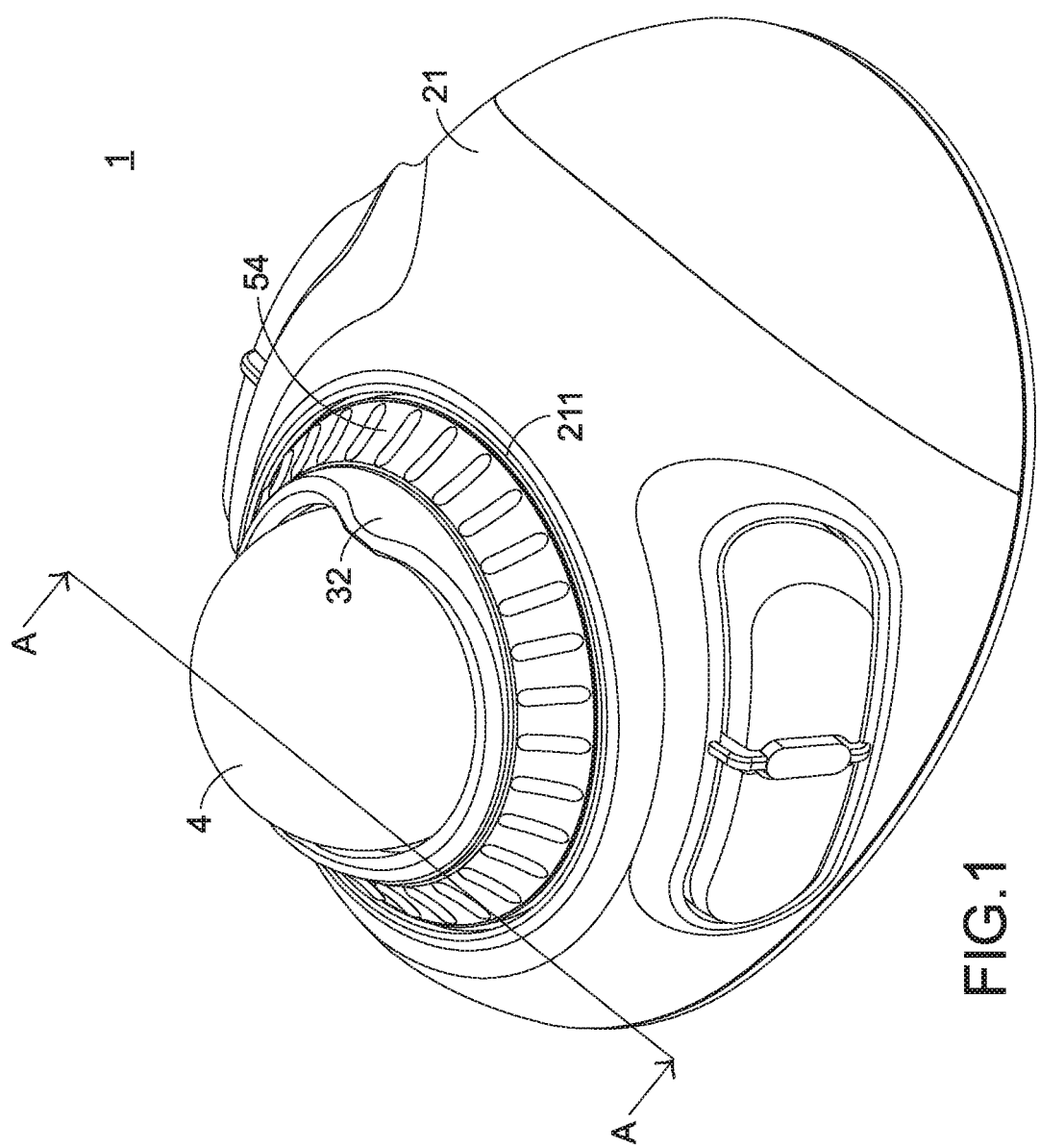
FIG. 1 is a schematic perspective view illustrating the structure of an input device according to a first embodiment of the present invention.
Figure 2:
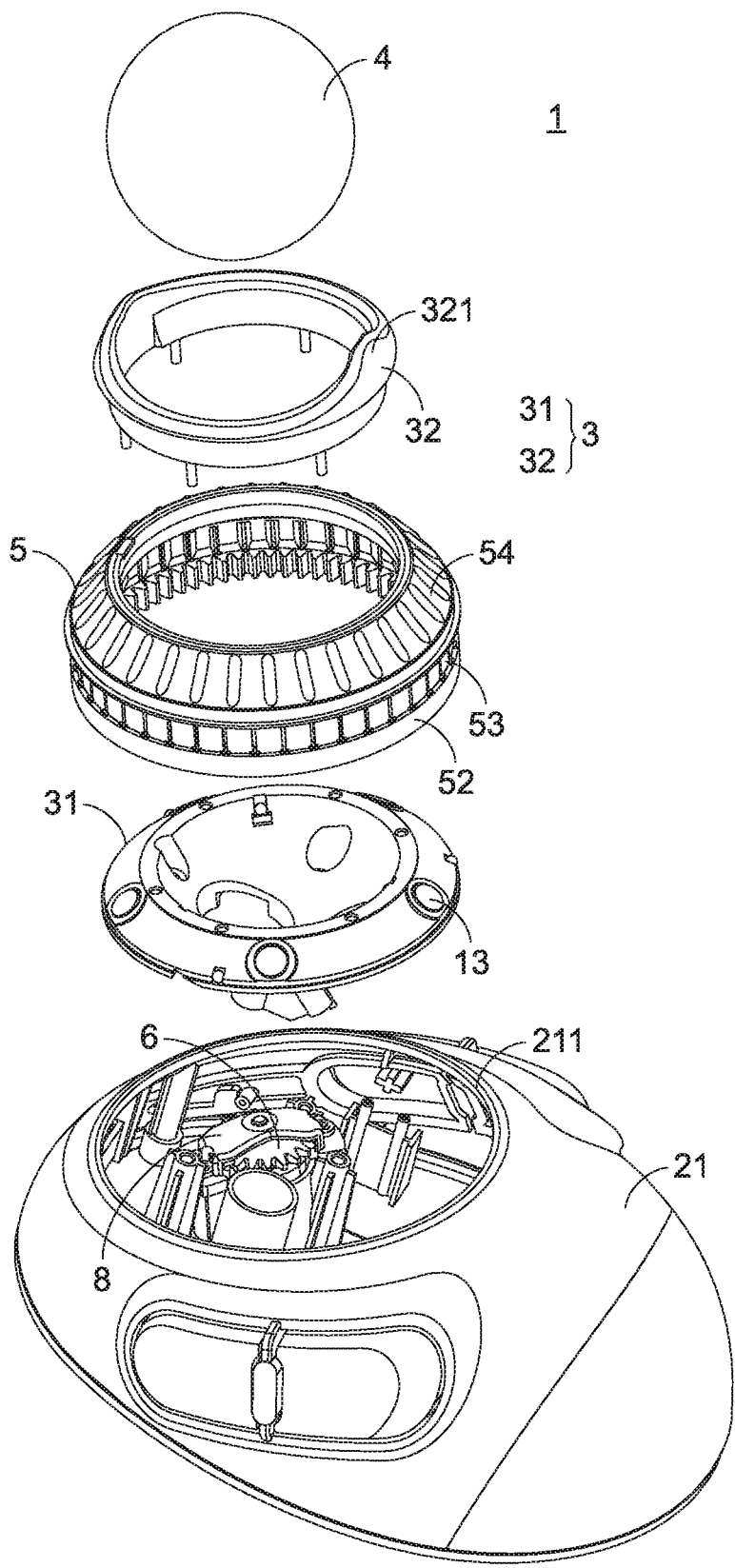
FIG. 2 is a schematic exploded view illustrating the structure of the input device as shown in FIG. 1.
Figure 3:
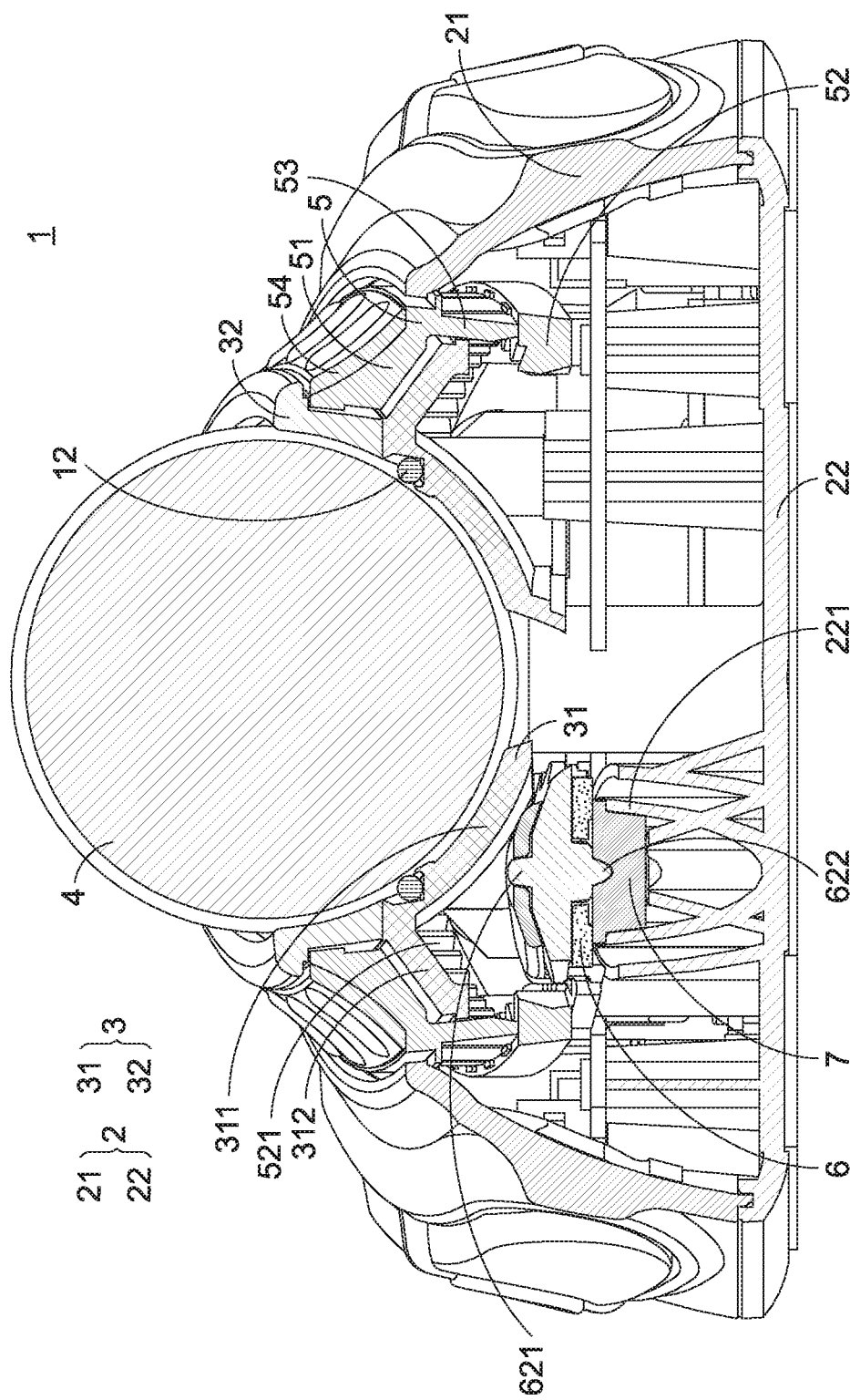
FIG. 3 is a schematic cutaway view illustrating the structure of the input device as shown in FIG. 1 and taken along the line A-A.
Figure 4:
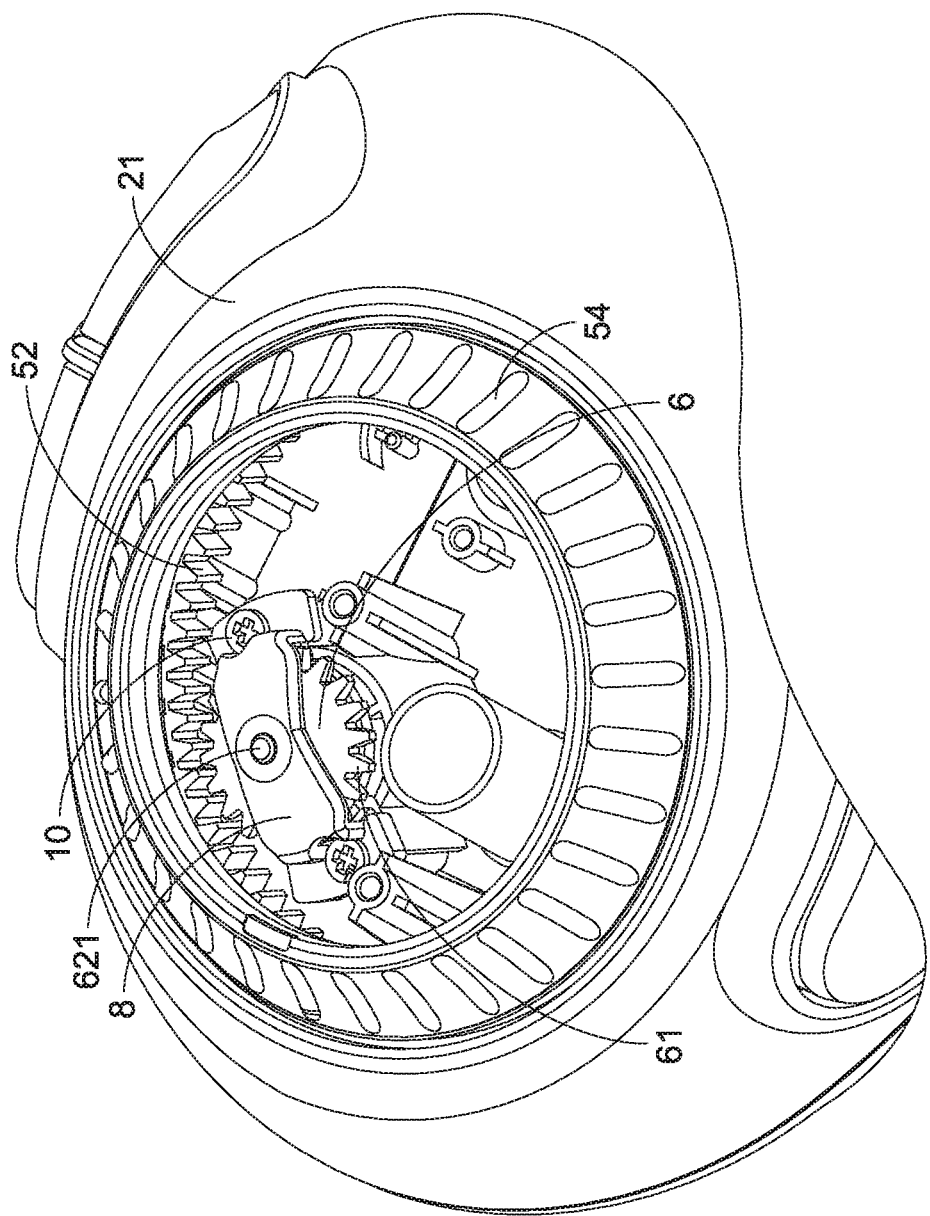
FIG. 4 is a schematic perspective view illustrating a portion of the input device as shown in FIG. 1, in which the base member and the ball member are not shown.
Figure 5:
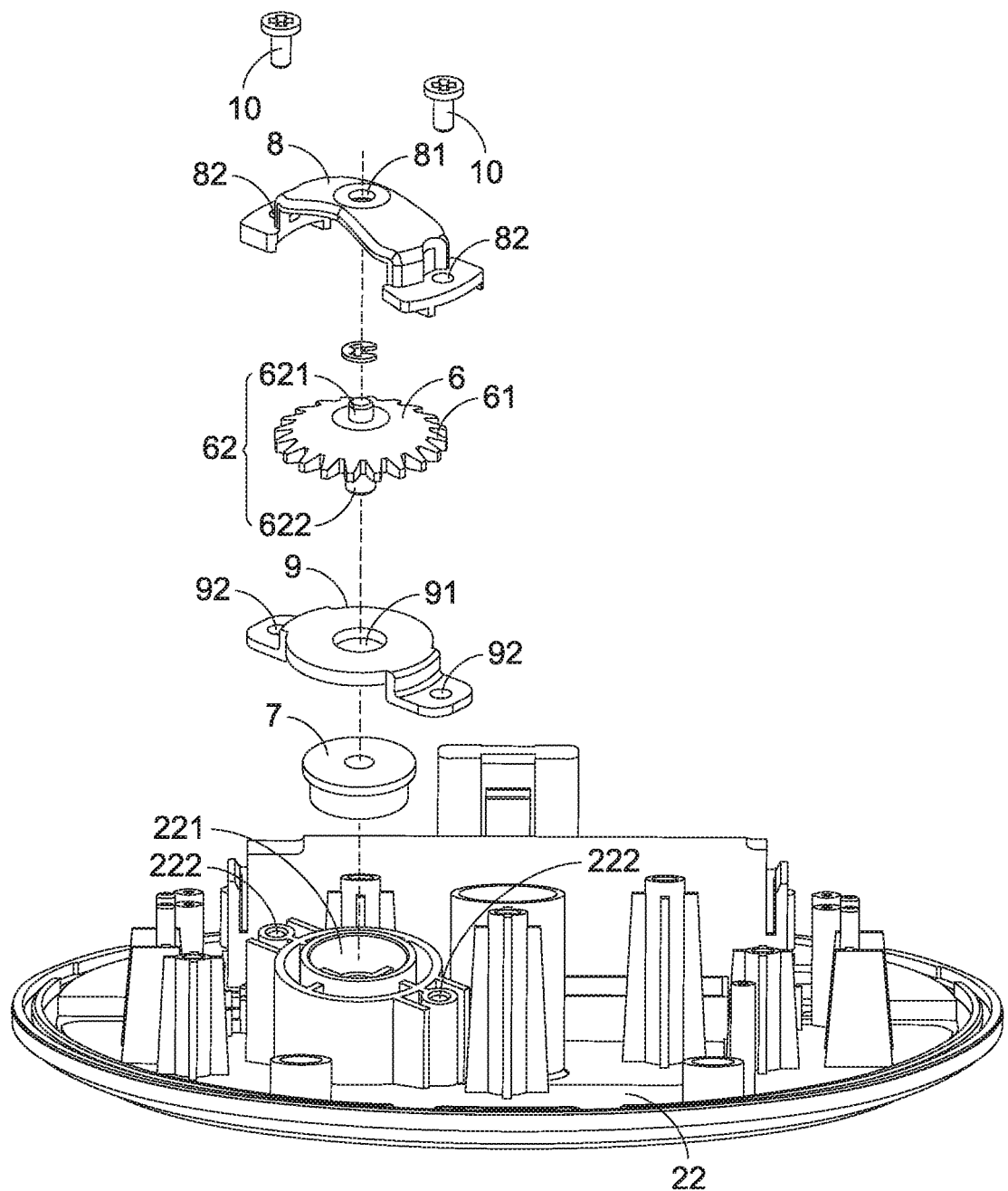
FIG. 5 is a schematic exploded view illustrating a portion of the input device as shown in FIG. 1, in which the upper cover, the base member, the ball member and the control ring are not shown.
Figure 6:
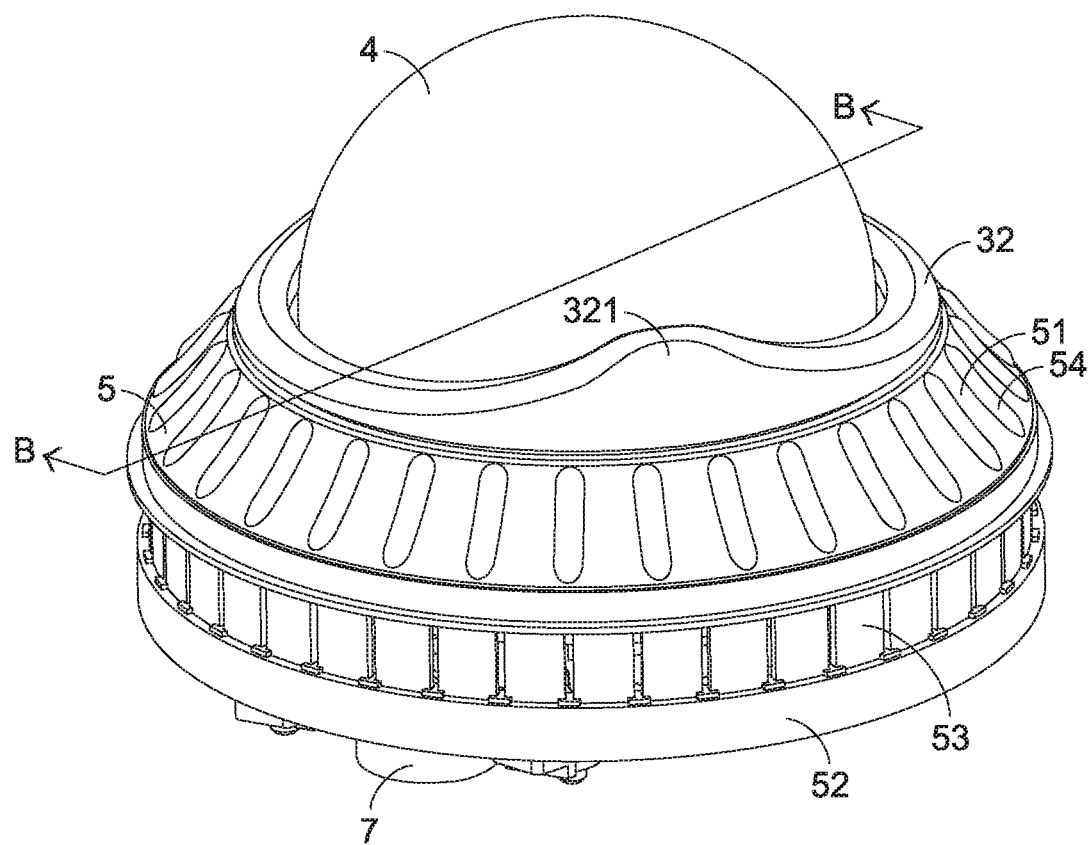
FIG. 6 is a schematic perspective view illustrating the assembled structure of the ball member, the base member, the control ring, the gravity wheel and the bearing of the input device as shown in FIG. 1.
Figure 7:
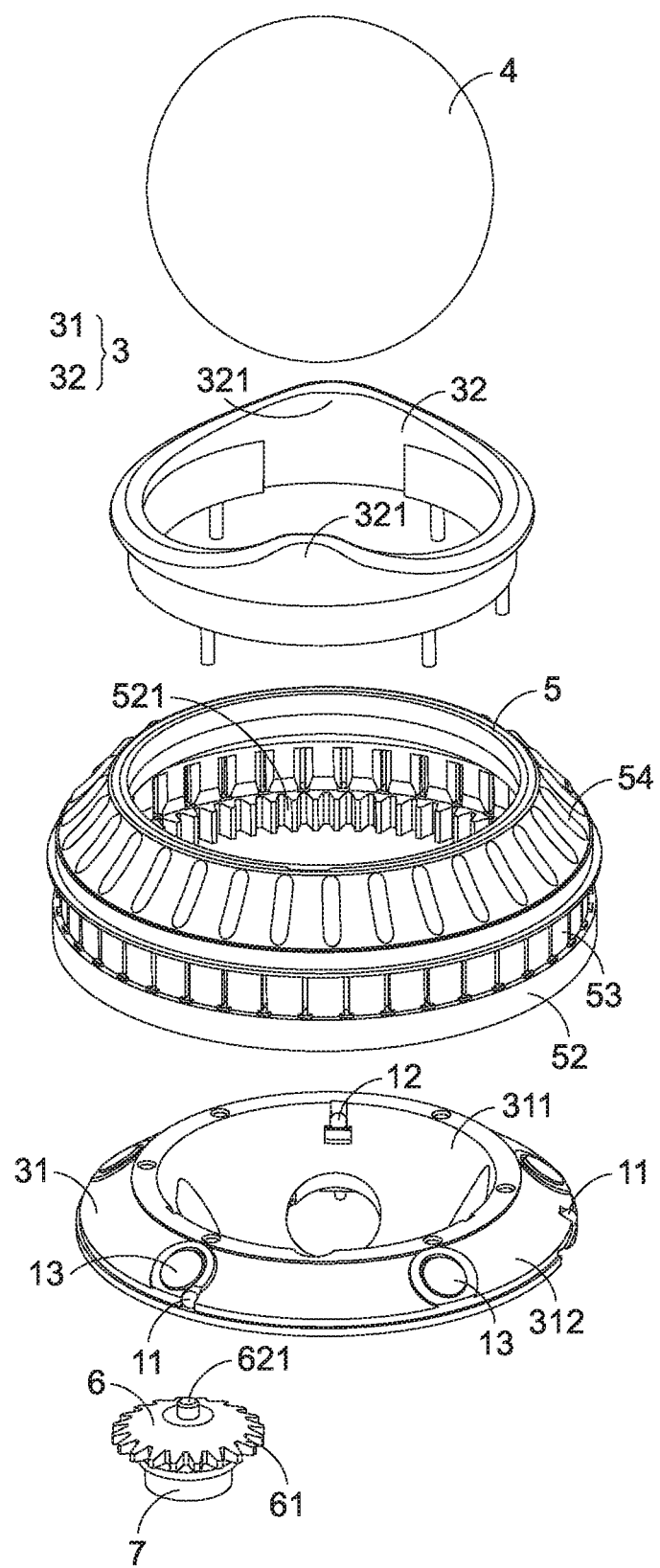
FIG. 7 is a schematic exploded view illustrating the ball member, the base member, the control ring, the gravity wheel and the bearing of the input device as shown in FIG. 1.
Figure 8:
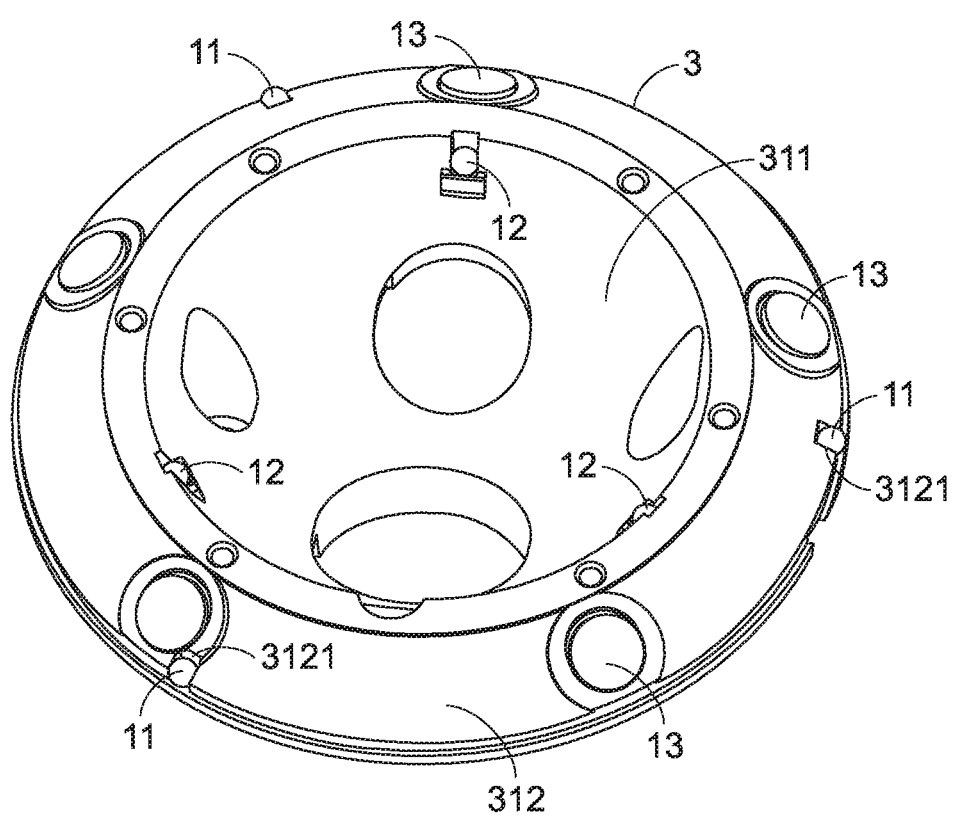
FIG. 8 is a schematic perspective view illustrating the supporting seat of the base member of the input device as shown in FIG. 1.
Figure 9:
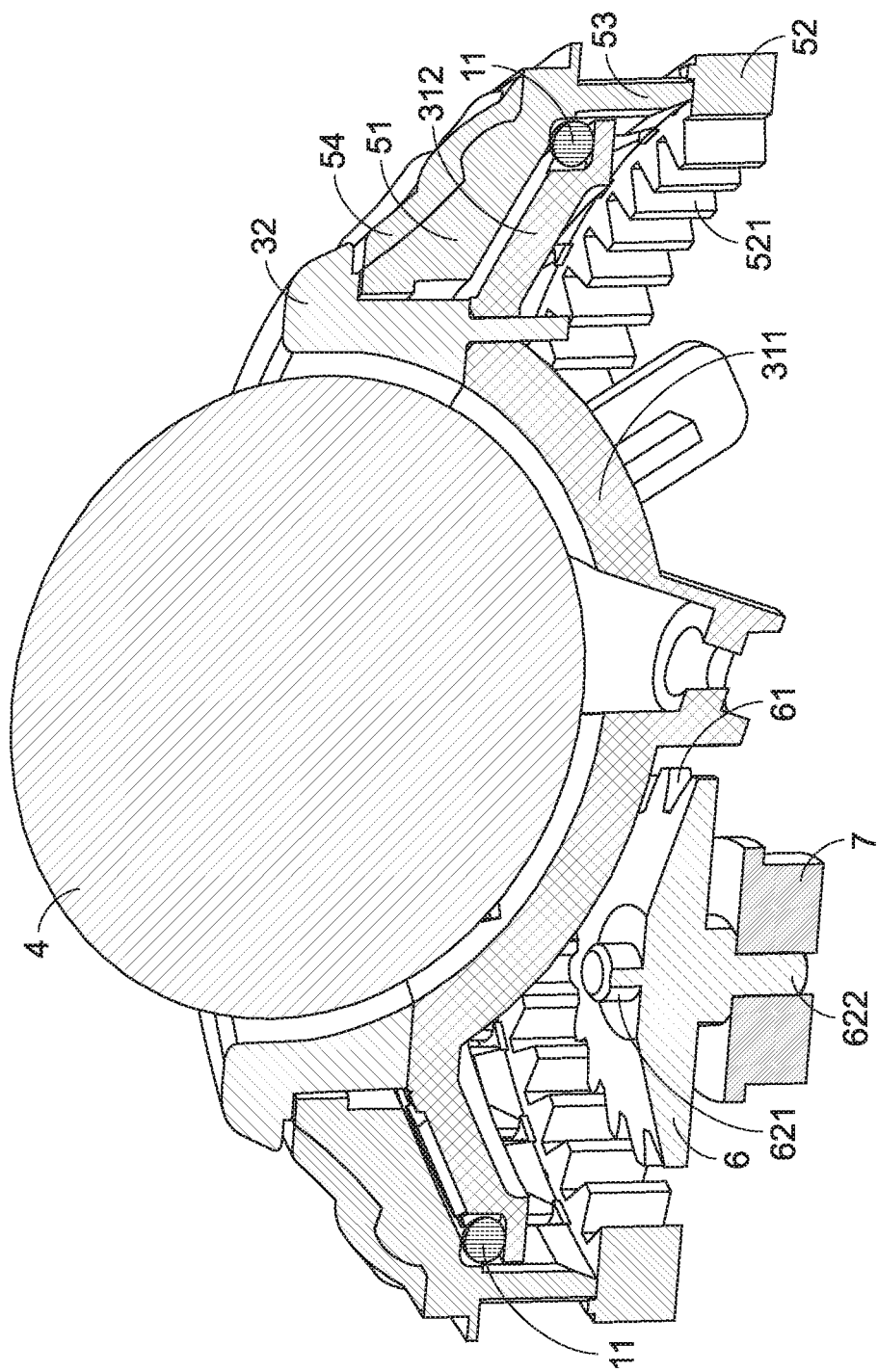
FIG. 9 is a schematic cutaway view illustrating the ball member, the base member, the control ring, the gravity wheel and the bearing of the input device as shown in FIG. 6 and taken along the line B-B.

Please refer to FIGS. 1 to 9. FIG. 1 is a schematic perspective view illustrating the structure of an input device according to a first embodiment of the present invention. FIG. 2 is a schematic exploded view illustrating the structure of the input device as shown in FIG. 1. FIG. 3 is a schematic cutaway view illustrating the structure of the input device as shown in FIG. 1 and taken along the line A-A. FIG. 4 is a schematic perspective view illustrating a portion of the input device as shown in FIG. 1, in which the base member and the ball member are not shown. FIG. 5 is a schematic exploded view illustrating a portion of the input device as shown in FIG. 1, in which the upper cover, the base member, the ball member and the control ring are not shown. FIG. 6 is a schematic perspective view illustrating the assembled structure of the ball member, the base member, the control ring, the gravity wheel and the bearing of the input device as shown in FIG. 1. FIG. 7 is a schematic exploded view illustrating the ball member, the base member, the control ring, the gravity wheel and the bearing of the input device as shown in FIG. 1. FIG. 8 is a schematic perspective view illustrating the supporting seat of the base member of the input device as shown in FIG. 1. FIG. 9 is a schematic cutaway view illustrating the ball member, the base member, the control ring, the gravity wheel and the bearing of the input device as shown in FIG. 6 and taken along the line B-B.

In this embodiment, the input device 1 comprises a casing 2, a base member 3, a ball member 4, a control ring 5 and a gravity wheel 6.

The casing 2 comprises an upper cover 21 and a lower cover 22. In an embodiment, the upper cover 21 and the lower cover 22 are two separate components that are assembled with each other. Alternatively, the upper cover 21 and the lower cover 22 are two parts that are integrated as a one-piece structure. The upper cover 21 has an opening 211. The ball member 4 and the control ring 5 are partially exposed outside the opening 211 so as to be operated by the user.

The ball member 4 is installed on the base member 3. The base member 3 comprises a supporting seat 31 and a stopping ring 32. The stopping ring 32 is installed on and assembled with the supporting seat 31. The stopping ring 32 comprises an inward raised structure 321 to stop the ball member 4 from being detached from the base member 3. The supporting seat 31 comprises a concave structure 311 and an inclined part 312. The ball member 4 is installed in the concave structure 311. Moreover, plural small balls 12 are installed in the concave structure 311 of the supporting seat 31 in order to reduce the direct friction between the ball member 4 and the concave structure 311.

In the vertical direction, the control ring 5 is clamped between the supporting seat 31 and the stopping ring 32 of the base member 3. In the horizontal direction, the control ring 5 is arranged around the base member 3. The control ring 5 is freely rotatable around the base member 3 in order to facilitate the user's operation.

The control ring 5 comprises an inclined part 51, a rack structure 52, a lateral wall 53 and an anti-slip structure 54. The lateral wall 53 is connected with the inclined part 51 and the rack structure 52. The anti-slip structure 54 is installed on the inclined part 51.

The anti-slip structure 54 is supported and carried by the inclined part 51. The inclined part 51 has a ring-shaped profile. The lateral wall 53 is protruded downwardly from the gap between the base member 3 and the upper cover 21 and inserted into the inner portion of the input device 1. In an embodiment, the inclined part 51 and the lateral wall 53 are two separate components that are assembled and connected with each other. Alternatively, the inclined part 51 and the lateral wall 53 are two parts that are integrated as a one-piece structure.

The lateral wall 53 is connected with the inclined part 51 and the rack structure 52. The anti-slip structure 54 is installed on the inclined part 51. Moreover, the anti-slip structure 54 can be directly touched by the user. The anti-slip structure 54 is a rib, a bumpy structure or any other non-smooth structure. Alternatively, the anti-slip structure 54 is made of rubber or any other appropriate anti-slip material.

The rack structure 52 is connected with the lateral wall 53. The rack structure 52 has a ring-shaped profile. The rack structure 52 is disposed within the inner portion of the input device 1. Moreover, the rack structure 52 is linked or rotated with the inclined part 51 and the lateral wall 53. The rack structure 52 comprises plural tooth structures 521. The tooth structures 521 may be installed on an inner surface or an outer surface of the rack structure 52. In this embodiment, the tooth structures 521 are installed on the inner surface of the rack structure 52.

The inclined part 51 of the control ring 5 is installed on the inclined part 312 of the supporting seat 31. The lateral wall 53 of the control ring 5 is arranged around the inclined part 312 of the supporting seat 31.

For allowing the control ring 5 to be freely and smoothly rotated on the supporting seat 31, the input device 1 is equipped with plural small balls 11 between the inclined part 51 of the control ring 5 and the inclined part 312 of the supporting seat 31. Consequently, the inclined part 51 of the control ring 5 and the inclined part 312 of the supporting seat 31 are separated from each other through the small balls 11, and the friction between the inclined part 51 of the control ring 5 and the inclined part 312 of the supporting seat 31 is reduced. In this embodiment, the small balls 11 are disposed within receiving recesses 3121 in the inclined part 312 of the supporting seat 31 and partially protruded outside the inclined part 312 of the supporting seat 31. The portions of the small balls 11 protruded outside the inclined part 312 of the supporting seat 31 are contacted with the inclined part 51 of the control ring 5 in a point contact manner.

In an embodiment, the input device 1 is equipped with plural lubricating pads 13 between the inclined part 51 of the control ring 5 and the inclined part 312 of the supporting seat 31. Consequently, the inclined part 51 of the control ring 5 and the inclined part 312 of the supporting seat 31 are separated from each other through the lubricating pads 13, and the friction between the inclined part 51 of the control ring 5 and the inclined part 312 of the supporting seat 31 is reduced. In this embodiment, the lubricating pads 13 are installed on the inclined part 312 of the supporting seat 31, and the lubricating pads 13 are made of Teflon.

Due to the above structural design, the control ring can be freely rotated. However, as previously described, the operation of the control ring may result in a light and empty feeling, or the user's accidental touch may rotate the control ring and erroneously generate a control signal. For overcoming the above drawbacks, the input device of the present invention is further equipped with a special design to suppress the rotation of the control ring 5. Consequently, the control ring 5 has a rotation damping effect.

For achieving the above rotation damping effect (i.e., a rotation buffering effect), the input device 1 is equipped with the gravity wheel 6 (or an idler wheel). The gravity wheel 6 is engaged with the rack structure 52 of the control ring 5. Consequently, the rotation of the control ring 5 can be suppressed. Even if the control ring 5 is accidentally and lightly touched by the user, the control ring 5 is not easily rotated. That is, the possibility of erroneously touching or erroneously rotating the control ring will be minimized.

The gravity wheel 6 comprises a gear 61 and a rotation shaft 62. The gear 61 is engaged with the tooth structures 521 of the rack structure 52. The rotation shaft 62 comprises a first shaft part 621 and a second shaft part 622. The first shaft part 621 and the second shaft part 622 are respectively located at two lateral sides of the gear 61. Moreover, the gravity wheel 6 is made of polyformaldehyde (POM), polycarbonate (PC) or aluminum.

For stably rotating the gravity wheel 6, the input device 1 is further equipped with a bearing (or a bearing bush) 7. In addition, the rotation shaft 62 of the gravity wheel 6 is inserted into the bearing (or the bearing bush) 7. For example, as shown in FIG. 9, the second shaft part 622 is inserted into the underlying bearing (or the bearing bush) 7. Moreover, the bearing (or the bearing bush) 7 is made of a wear-resistant material or a metallic material. Consequently, the service life of the gravity wheel 6 is prolonged, and the stability of the gravity wheel 6 during rotation is enhanced.

Please refer to FIGS. 3 and 5 again. In an embodiment, the input device 1 is further equipped with an accommodation space 221 in the lower cover 22. The bearing (or the bearing bush) 7 is accommodated within the accommodation space 221. Due to the accommodation space 221, the stability of the bearing (or the bearing bush) 7 and the gravity wheel 6 during operations will be enhanced.

In order to prevent from the violent up/down shaking or shifting action of the gravity wheel 6 during rotation, the input device 1 comprises an upper clamping seat 8 and a lower clamping seat 9. Moreover, the gravity wheel 6 is clamped between the upper clamping seat 8 and the lower clamping seat 9.

Please refer to FIG. 5 again. The upper clamping seat 8 comprises a pivotal hole 81 and at least one perforation 82. The lower clamping seat 9 comprises a pivotal hole 91 and at least one perforation 92. In addition, the lower cover 22 comprises at least one stud 222. After at least one screw 10 is penetrated through the corresponding perforation 82 and the corresponding perforation 92 sequentially, the screw 10 is tightened into the corresponding stud 222. Consequently, the upper clamping seat 8, the gravity wheel 6, the lower clamping seat 9 and the bearing (or the bearing bush) 7 are securely installed on the lower cover 22 of the input device 1. After the upper clamping seat 8, the gravity wheel 6, the lower clamping seat 9 and the bearing (or the bearing bush) 7 are assembled with each other, the first shaft part 621 of the gravity wheel 6 is inserted into the pivotal hole 81, and the second shaft part 622 is penetrated through the pivotal hole 91 and inserted into the underlying bearing (or the bearing bush) 7.

For increasing the rotation damping effect, a weight ring and a magnet are collaboratively used to increase the difficulty of rotating the gravity wheel.

Figure 10:
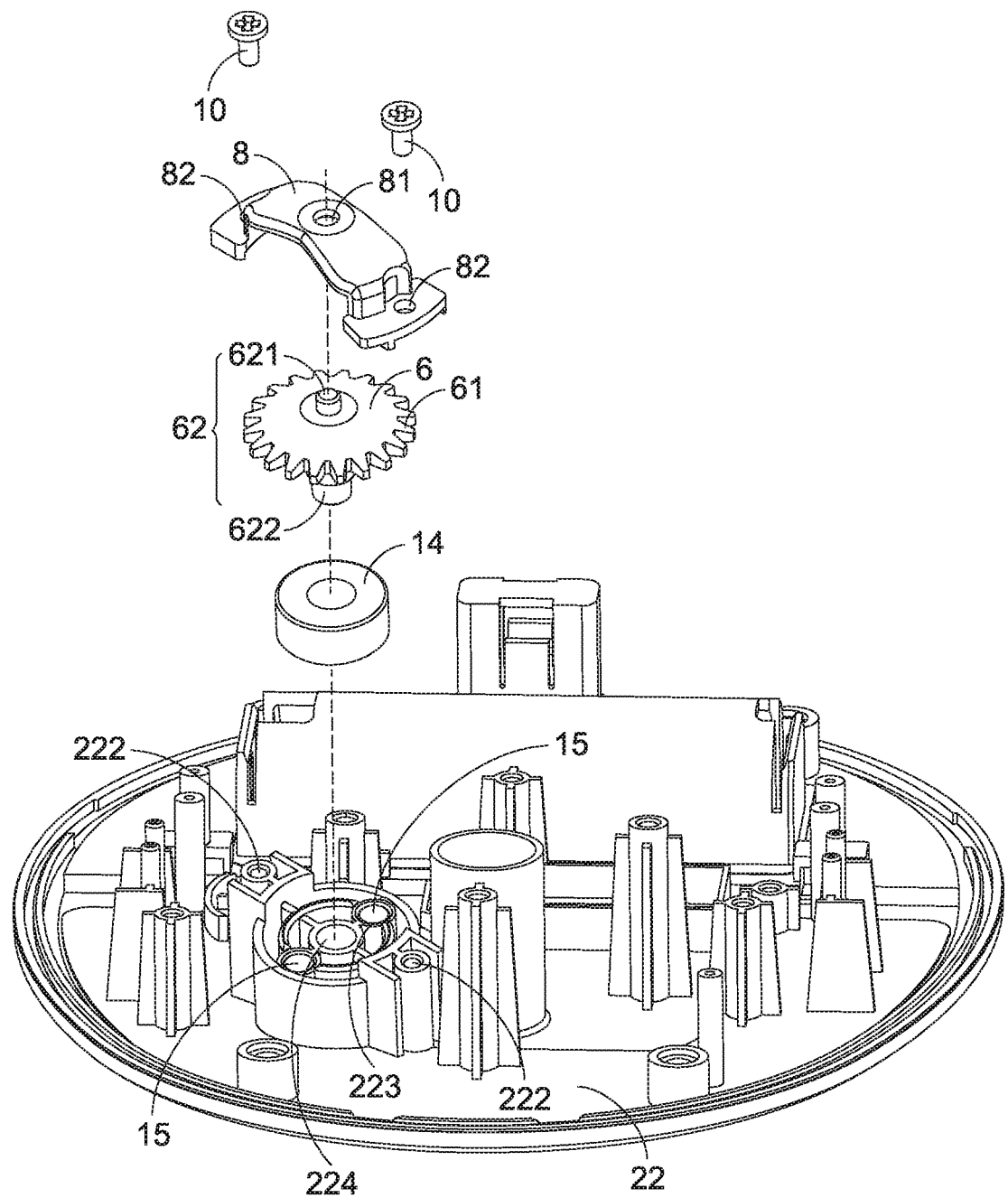
FIG. 10 is a schematic exploded view illustrating the upper clamping seat, the gravity wheel, the weight ring, the magnet and the lower cover of an input device according to a second embodiment of the present invention.
Figure 11:
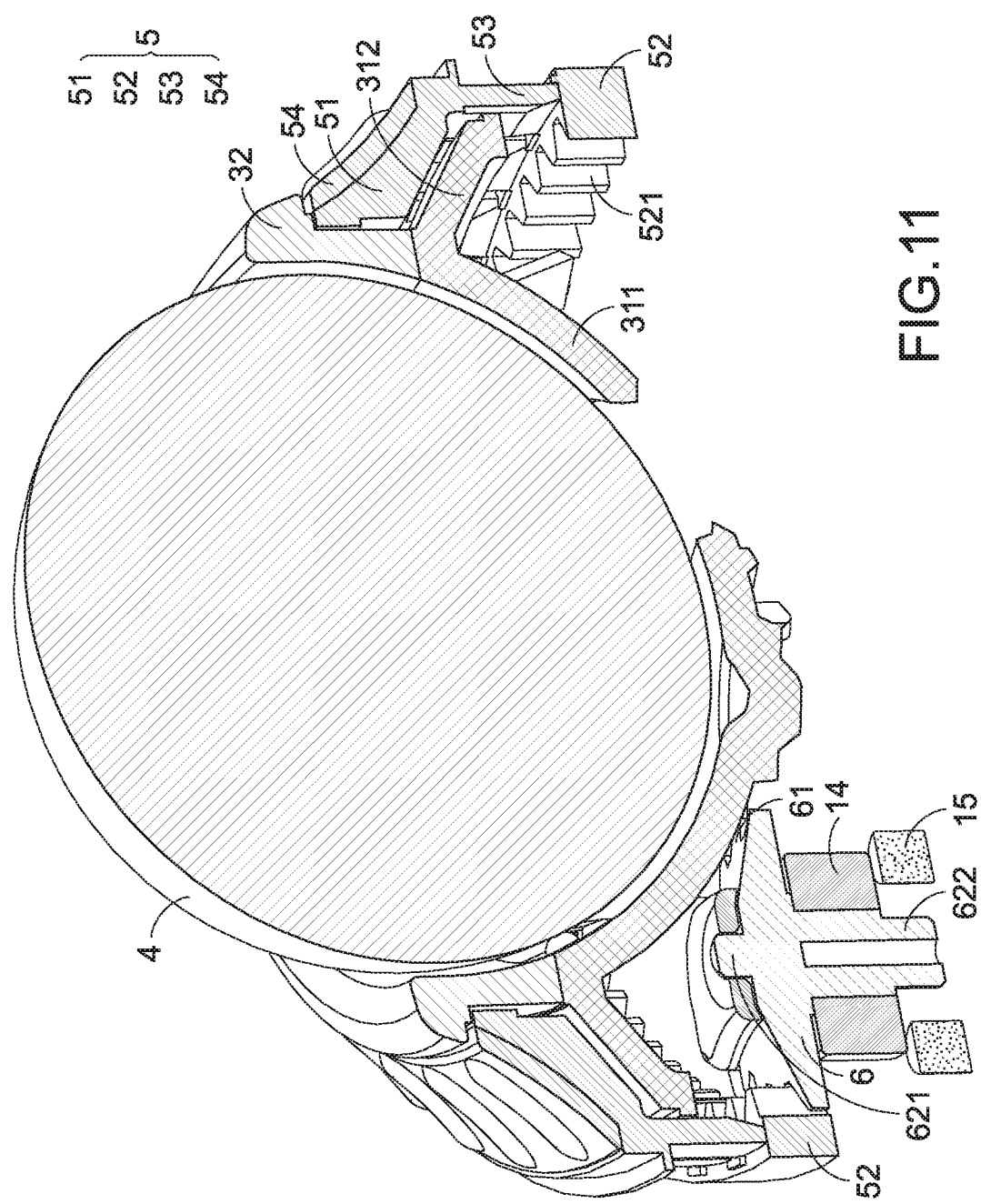
FIG. 11 is a schematic cutaway view illustrating the ball member, the base member, the control ring, the upper clamping seat, the gravity wheel, the weight ring and the magnet of the input device according to the second embodiment of the present invention.

FIG. 10 is a schematic exploded view illustrating the upper clamping seat, the gravity wheel, the weight ring, the magnet and the lower cover of an input device according to a second embodiment of the present invention. FIG. 11 is a schematic cutaway view illustrating the ball member, the base member, the control ring, the upper clamping seat, the gravity wheel, the weight ring and the magnet of the input device according to the second embodiment of the present invention. In comparison with the input device of the first embodiment, the input device of the first embodiment further comprises a weight ring and a magnet to increase the resistance of rotating the gravity wheel.

As shown in FIGS. 10 and 11, the input device of the second embodiment comprises an upper clamping seat 8, a gravity wheel 6, a weight ring 14, at least one magnet 15, an accommodation space 223 and at least one pivotal hole 224. The upper clamping seat 8 comprises a pivotal hole 81 and at least one perforation 82. The gravity wheel 6 comprises a gear 61, a first shaft part 621 and a second shaft part 622. The gravity wheel 6 is arranged between the upper clamping seat 8 and the weight ring 14. In addition, the gear 61 is engaged with the rack structure 52 of the control ring 5. The weight ring 14 is made of a metallic material with magnetic permeability. For example, the weight ring 14 is a carbon steel or a silicon steel sheet. The at least one magnet 15 is located under the weight ring 14. In this embodiment, the at least one magnet 15 comprises two magnets 15. The magnet 15 can magnetically attract the weight ring 14. Since the accommodation space 223 and the lower cover 22 are specially designed, the at least one magnet 15 and the weight ring 14 are separated from each other by a distance and the at least one magnet 15 and the weight ring 14 are not contacted with each other. The stud 222, the accommodation space 223 and the pivotal hole 224 are formed on/in the lower cover 22. The at least one magnet 15 is accommodated within the accommodation space 223. The second shaft part 622 is inserted into the pivotal hole 224. After at least one screw 10 is penetrated through the corresponding perforation 82 of the upper clamping seat 8, the screw 10 is tightened into the corresponding stud 222. Consequently, the upper clamping seat 8, the gravity wheel 6 and the weight ring 14 are installed on the lower cover 22 of the input device. Moreover, the first shaft part 621 of the gravity wheel 6 is inserted into the pivotal hole 81, and the second shaft part 622 is penetrated through the underlying weight ring 14 and inserted into the pivotal hole 224.

The magnet 15 and the weight ring 14 are magnetically attracted by each other. Since the gravity wheel 6 is installed on the weight ring 14, the resistance of rotating the gravity wheel 6 will be increased. When the control ring 5 is operated by the user, the resistance of rotating the control ring is increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input device, comprising:
   a casing comprising an upper cover and a lower cover, wherein the upper cover has an opening;
   a base member;
   a ball member installed on the base member, wherein the ball member is partially exposed outside the opening;
   a control ring arranged around the base member, wherein the control ring is partially exposed outside the opening, and the control ring is freely rotatable around the base member, wherein the control ring comprises a first inclined part, a rack structure, and a lateral wall, and the lateral wall is connected with the first inclined part and the rack structure; and
   a gravity wheel engaged with the rack structure, wherein a rotation of the control ring is suppressed by the gravity wheel,
   wherein the base member comprises a supporting seat, and the supporting seat comprises a concave structure and a second inclined part, wherein the ball member is installed within the concave structure, and the first inclined part of the control ring is installed on the second inclined part.

2. The input device according to claim 1, wherein the input device further comprises a bearing, and the gravity wheel comprises a gear and a rotation shaft, wherein the gear is engaged with the rack structure, and the rotation shaft is inserted into the bearing.

3. The input device according to claim 2, wherein the input device further comprises an accommodation space, wherein the accommodation space is formed in the lower cover, and the bearing is accommodated within the accommodation space.

4. The input device according to claim 1, wherein the input device further comprises an upper clamping seat and a lower clamping seat, wherein the gravity wheel is clamped between the upper clamping seat and the lower clamping seat, and the upper clamping seat and the lower clamping seat are installed on the lower cover.

5. The input device according to claim 4, wherein the input device further comprises a screw, the upper clamping seat comprises a first pivotal hole and a first perforation, the lower clamping seat comprises a second pivotal hole and a second perforation, and the lower cover comprises a stud, wherein after the screw is penetrated through the first perforation and the second perforation sequentially, the screw is tightened into the stud.

6. The input device according to claim 1, wherein the input device further comprises a bearing, an upper clamping seat and a lower clamping seat, wherein the gravity wheel is clamped between the upper clamping seat and the lower clamping seat, the upper clamping seat comprises a first pivotal hole, the lower clamping seat comprises a second pivotal hole, the gravity wheel comprises a gear and a rotation shaft, and the rotation shaft comprises a first shaft part and a second shaft part, wherein the first shaft part and the second shaft part are respectively located at two lateral sides of the gear, the first shaft part is inserted into the first pivotal hole, and the second shaft part is penetrated through the second pivotal hole and inserted into a bearing of the input device.

7. The input device according to claim 1, wherein the gravity wheel is made of polyformaldehyde (POM), polycarbonate (PC) or aluminum.

8. The input device according to claim 1, wherein the input device further comprises plural first balls, and the first inclined part and the second inclined part are separated from each other through the plural first balls.

9. The input device according to claim 8, wherein the plural first balls are installed on the second inclined part and partially protruded outside the second inclined part.

10. The input device according to claim 1, wherein the input device further comprises plural lubricating pads, wherein a friction between the first inclined part and the second inclined part is reduced through the plural lubricating pads.

11. The input device according to claim 10, wherein the plural lubricating pads are installed on the second inclined part.

12. The input device according to claim 10, wherein the plural lubricating pads are made of Teflon.

13. The input device according to claim 1, wherein the base member further comprises a stopping ring, and the stopping ring is installed on and assembled with the supporting seat, wherein the stopping ring stops the ball member from being detached from the base member.

14. The input device according to claim 1, wherein the lateral wall is arranged around the second inclined part.

15. The input device according to claim 1, wherein the control ring further comprises an anti-slip structure, the anti-slip structure is installed on the first inclined part.

16. The input device according to claim 1, wherein the input device further comprises a weight ring, the gravity wheel comprises a gear and a rotation shaft, and the rotation shaft comprises a first shaft part and a second shaft part, wherein the first shaft part and the second shaft part are respectively located at two lateral sides of the gear, the gear is engaged with the rack structure, and the second shaft part is inserted into the weight ring.

17. The input device according to claim 16, wherein the weight ring is made of a metallic material with magnetic permeability.

18. The input device according to claim 17, wherein the input device further comprises a magnet, and the magnet is located under the weight ring, wherein the weight ring is magnetically attracted by the magnet, and the magnet and the weight ring are not contacted with each other.

19. An input device, comprising:
- a casing comprising an upper cover and a lower cover, wherein the upper cover has an opening;
- a base member;
- a ball member installed on the base member, wherein the ball member is partially exposed outside the opening;
- a control ring arranged around the base member, wherein the control ring is partially exposed outside the opening, and the control ring is freely rotatable around the base member, wherein the control ring comprises a first inclined part, a rack structure, and a lateral wall, and the lateral wall is connected with the first inclined part and the rack structure; and
- a gravity wheel engaged with the rack structure, wherein a rotation of the control ring is suppressed by the gravity wheel, wherein the input device further comprises an upper clamping seat and a lower clamping seat, wherein the gravity wheel is clamped between the upper clamping seat and the lower clamping seat, and the upper clamping seat and the lower clamping seat are installed on the lower cover.

20. An input device, comprising: a casing comprising an upper cover and a lower cover, wherein the upper cover has an opening; a base member; a ball member installed on the base member, wherein the ball member is partially exposed outside the opening; a control ring arranged around the base member, wherein the control ring is partially exposed outside the opening, and the control ring is freely rotatable around the base member, wherein the control ring comprises a first inclined part, a rack structure, and a lateral wall, and the lateral wall is connected with the first inclined part and the rack structure; and a gravity wheel engaged with the rack structure, wherein a rotation of the control ring is suppressed by the gravity wheel, wherein the input device further comprises a weight ring, the gravity wheel comprises a gear and a rotation shaft, and the rotation shaft comprises a first shaft part and a second shaft part, wherein the first shaft part and the second shaft part are respectively located at two lateral sides of the gear, the gear is engaged with the rack structure, and the second shaft part is inserted into the weight ring.

* * * * *